US007398157B2

(12) United States Patent
Sigurdsson et al.

(10) Patent No.: US 7,398,157 B2
(45) Date of Patent: Jul. 8, 2008

(54) METHOD AND SYSTEM FOR DETERMINING A TRACK RECORD OF A MOVING OBJECT (75) Inventors: Gudmundur Gretar Sigurdsson, Hafnarfjöröur (IS); Hoskuldur Thor Arason, Reykjavik (IS); Sigurjon Oskarsson, Reykjavik (IS); Vilhjalmur Andri Einarsson, Reykjavik (IS); Thorolfur Gunnarsson, Mosfellsbær (IS)

(73) Assignee: ND a Islandi Ehf., Reykjavik (IS)

( * ) Notice: Subject to any disclaimer, the term of this patent is extended or adjusted under 35 U.S.C. 154(b) by 407 days.

(21) Appl. No.: 10/507,447

(22) PCT Filed: Mar. 14, 2003

(86) PCT No.: PCT/IS03/00012

§ 371 (c)(1),
(2), (4) Date: Apr. 12, 2005

(87) PCT Pub. No.: WO03/077206

PCT Pub. Date: Sep. 18, 2003

(65) Prior Publication Data

US 2005/0256640 A1    Nov. 17, 2005

Related U.S. Application Data

(60) Provisional application No. 60/363,845, filed on Mar. 14, 2002.

(30) Foreign Application Priority Data

Mar. 14, 2002 (IS) .......................................... 6301

(51) Int. Cl.
*G01C 21/36* (2006.01)
(52) U.S. Cl. ...................... 701/213; 701/200; 340/988; 342/357.12
(58) Field of Classification Search ................. 701/200, 701/213–215; 342/357.06, 357.9, 357.1, 342/357.12; 340/988
See application file for complete search history.

(56) References Cited

U.S. PATENT DOCUMENTS

| 4,402,049 | A | 8/1983 | Gray |
| 5,736,962 | A | 4/1998 | Tendler |
| 5,787,384 | A | 7/1998 | Johnson |
| 6,005,513 | A | 12/1999 | Hardesty |
| 6,064,970 | A | 5/2000 | Heinen et al. |
| 6,115,655 | A | 9/2000 | Evans et al. |

(Continued)

FOREIGN PATENT DOCUMENTS

EP    0 545 636 A    6/1993

(Continued)

*Primary Examiner*—Yonel Beaulieu
(74) *Attorney, Agent, or Firm*—Birch, Stewart, Kolasch & Birch, LLP (57) ABSTRACT

A method and system is presented for determining a track record of a moving object by determining at least one characteristic property of the object, such as the velocity, acceleration, cetripetal acceleration, total travelled distance and total time. This is solved by utilizing a plurality of received Global-Positioning System (GPS) coordinates, each of the coordinates comprising the momentary position and the actual time of the moving object, and storing the at least one coordinates data in a storage means. From these coordinates the at least one characteristic property of the moving object is determined and thereby the track record of the moving object.

38 Claims, 4 Drawing Sheets

U.S. PATENT DOCUMENTS

2001/0047244 A1  11/2001  Harrison et al.
2002/0029109 A1  3/2002  Tsoi et al.

FOREIGN PATENT DOCUMENTS

METHOD AND SYSTEM FOR DETERMINING A TRACK RECORD OF A MOVING OBJECT

This application claims priority from U.S. Provisional Application No. 60/363,845 filed 14 Mar. 2002.

FIELD OF THE INVENTION

The present invention relates to a method and system for determining a track record of a moving object by determining at least one characteristic property of the object.

BACKGROUND

Today, we are facing a global problem, which increases every year. This is the heavy traffic, including car traffic, air traffic and traffic at sea. The result is a huge increase in accidents every day leaving thousands of people injured or killed all over the world. In addition to affecting peoples health and lives, these accidents also involve a huge cost for the society. Accidents, on land, in air or at sea, may be related to many different reasons. In the western world, the statistics tells that the group that causes the most car accidents are young people around the age of 17-20 years old and professions such as food deliveries. Besides this, dangerous roads, sailing routs and frequently turbulent air spaces are areas of focus, when looking at statistics of accidents. By monitoring these risk groups or areas, the accident frequency may be reduced, as well the cost that follows the accidents.

Another important application is by creating an additional "Black box" for aircrafts, being a data storing and reporter means to monitor repeatedly the exact position of the aircraft in a more detailed way than it is done today. If an aircraft is outside its predefined route, a warning could be sent; to the air-traffic control. The warning signal could also comprise unusual flying behaviour. In today's systems the communication to the air-traffic control can be disconnected within the aircraft. This is a possible scenario, where an airplane is hijacked. In such cases it is impossible to monitor the trajectory of the aircraft. Accordingly by implementing such a data storing and reporter means in the fin or the tail of the aircraft as an example, the connection to the air traffic control cannot be interrupted.

It is apparent that there is a need for device, a data storing and reporter means, for obtaining a track record of a moving object.

In U.S. Pat. No. 5,805,079 a system and method is presented for monitoring movements and performance of a motor vehicle, in order to locate it and determine the manner in which it is driven. This is solved by evaluating and recording the driving method over a period of time. One of the variables that is monitored is the acceleration or deceleration of the vehicle, determined by a sensing module. From the acceleration the location, the speed and direction of travel is calculated. It is however mentioned that the position of the vehicle may be determined from the Global-positioning-system (GPS). The operation of the system is controlled with a microprocessor, wherein a separate performance analysing computer with a fuzzy logic circuitry and a neural network circuit is provided to process data collected from the sensing device to analyse how the vehicle is driven.

Another invention is described in the U.S. Pat. No. 5,919,239-A patent, where a GPC receiver obtains GPS signals and automatically or manually stores information such as position and time of position. The system in this invention sends information from system/device to computer in a control unit where a track record can be created. A similar device has been described for airplane in JP 10035593. A tracking recorder for three-dimenstional positioning utilises GPS coordinates and calculates from these coordinates variables such as latitude, longitude and altitude. These informations can be used afterwards to, show the flight route.

US 2002/029109 A1 discloses s system for recording positional and operational data of a vehicle including a GPS receiver and a storage means for GPS data. The stored data may comprise parameters such as velocity and distance travelled, as well as supervision of a moving object with regard to a three-dimensional frame set.

The problem with the above systems is how complicated they are and the lack of real time processing and communication of collected and calculated data obtained and processed by these system. For example, these systems do not utilize the GPS coordinates in order to determine variables such as the acceleration and the perpendicular acceleration, which is important for determining in which manner a moving object is steered and how accurately it maintains it's route.

DESCRIPTION OF THE INVENTION

It is an object of the present invention to provide a simple method and a low cost and compact system for obtaining a track record of a moving object, and thereby reducing accident rate. It is a further object of the present invention to provide a method and a system for utilization as a data collection, processing and a reporter system for moving objects such as aircrafts and ships. This system uses GPS coordinates and real time processing of for monitoring and reporting the objects position as well as other physical parameters, such as speed, acceleration and centripetal acceleration of the moving object According to the first aspect, the present invention relates to a method for determining a track record of a moving object by determining at least one characteristic properties of the object, said method comprising:

receiving at least three Global-Positioning-System (GPS) coordinates, each of the coordinates comprising the current position of the moving object and the current time, at which the moving object is at the current position,     storing said coordinates data in a storage means,     utilizing the at least three coordinates for determining said plurality of characteristic properties of the moving object, and thereby obtaining a track record for the moving object, wherein the track record comprises information related to:

direction of movement velocity perpendicular acceleration and wherein said track record data is utilized to create user information.

Preferably, the coordinates data are stored as at least one data package comprising one timestamp coordinate point as a reference point for said at least one data package, the timestamp giving the absolute position and absolute time of the moving object, and a plurality of coordinate data points as a deviation from the timestamp coordinate point. As an example the data package consists of 28 GPS coordinates points, including the GPS timestamp coordinate point. The number of data in each package is however not essential. The timestamp point requires much space because of all the information, i.e. the exact location (global) and the exact time. The additional points in the data package use however the timestamp as a reference point, and therefore instead of giving the exact position and the exact time of each coordinate point, which is very space demanding, the deviation from the timestamp is used and stored. This minimizes the memory required for storing each data point. Accordingly, each data package may be regarded as one coordinate system with the timestamp as the reference point. By using a plurality of such data package, and therefore defining a new timestamp point, the errors are minimized, due to the fact that the deviation from these reference points are being registered and stored, and not the absolute GPS-coordinate points.

In one embodiment the stored GPS coordinates data is transmitted to a computer system to a receiver side that is provided with a computer program for determining said at least one characteristic property of the moving object. This transmission may be a wireless transmission, such as through a satellite system or telephone network or the transmission may be through plugging the system to a computer system. In another preferred embodiment said characteristic property of the moving object may be determined and optionally stored prior to transmitting the data, whether or not the data is the GPS coordinates or said characteristic property data or both are transmitted to a receiver side, wherein the transmission may be as mentioned above.

Both these embodiments depend on how compact the system is supposed to be. If the computer system is on the receiver side the system may be more compact, such as in the size range of box of matches. The coordinates data may be stored as at least one data package, the at least one data package comprising at least one timestamp coordinate point as a reference point for said at least one data package, the timestamp giving the absolute position and absolute time of the moving object, and a plurality of coordinate data points as a deviation from the timestamp coordinate point. This methodology requires a lot less space than conventional methods and is therefore less costly.

The moving object may be a motor running vehicle, wherein the at least one characteristic property is at least one of the following:
perpendicular acceleration of the moving object $a_{cent}$,
the acceleration of the moving object a,
the velocity of the moving object v,
the total travelled distance of the moving object s,
the location and a time (x,y,t), and
the total travelling time of the moving object $t_{total}$.

These characteristic properties data may be determined through standard calculations utilizing the basic laws of physics, i.e.:

$$a_{cent} = \frac{V^2}{R},$$

$$a = \frac{\Delta v}{\Delta t},$$

$$v = \frac{\Delta s}{\Delta t},$$

$$s = \sum_i \Delta s_i, \text{ and}$$

$$t_{total} = \sum_i \Delta t_i,$$

where $\Delta v$ is the variation in the speed of the moving object in the time interval $\Delta t$, $\Delta s$ the distance the moving object has travelled in the time interval $\Delta t$, $\Delta s_i$ the distance between two GPS coordinates, which may be adjacent coordinates, $\Delta t_i$ the time interval between two GPS coordinates, which may be adjacent coordinates and V is the tangential speed of the moving object in a circle of radius R. The radius R may be determined by observing the path route of the moving object. From this path the curve is assumed as a sector of a circle in a first approximation, from which the radius R may be determined. The condition $\Delta t \rightarrow 0$ gives the instant instantaneous velocity and acceleration.

The time interval between two received GPS-coordinates depends on the GPS satellite system as well as the processing speed of the system.

In a preferred embodiment of the present invention, the information may comprise any of the following:
moving manner,
velocity comparison with a velocity database,
wherein the velocity database includes information about upper and lower velocity limits in certain areas.

A predetermined upper and lower limit of the at least one characteristic property may be defined, mainly for the track recorded. Thus the track record of the moving object may be based on the data that exceeds sail predetermined limits such as the velocity and the acceleration, both linear and lateral acceleration (perpendicular acceleration or centripetal acceleration) to the direction of the moving vehicle. The track record may also contain information relating to position of the vehicle. These predetermined limits may also be used as a warning signal, indicating when the moving object is driven to fast, when the acceleration is to large etc.

The reading of the first GPS coordinates data may be bound to a minimum velocity of the object, i.e. if the object exceeds a predetermined velocity limit, which may as an example be 5 km/hour, the first GPS data is collected.

Calculations of other physical (dynamical) parameters, where the GPS coordinates are employed, are also possible.

In one embodiment means for obtaining at least one environmental parameter is provided, wherein each of said parameters can be associated with a GPS coordinate. These parameters could for instance be precipitation, temperature, moisture, wind-speed. Under certain circumstances the at least one environmental parameter could influence how the upper-and lower limit of the at least one characteristics property is defined. As an example, if weather conditions would change resulting in icing on roads, that information could be stored in a database and transformed into a signal resulting in a lowered speed limit on the roads in a given area.

Accordingly, the track record, which may be coordinates or any of the above mentioned physical quantities (characteristic property) are stored and given an exact location with a time. The time period in which these characteristic properties were determined may be based on the time from starting the automobile until it is stopped. In one embodiment the receiving of the first GPS coordinates may be based on that the automobile is moving and exceeds said predetermined limits. If the automobile is under this minimum velocity, no data is collected and stored. If the automobile exceeds this minimum-velocity the first GPS data is collected and the calculations of the at least one characteristic property starts, and stops when the velocity goes under the minimum velocity. If the amount of data exceeds the upper limit of the storage means, the new data may replace the oldest data.

All these physical characteristic properties are determined by the GPS-coordinates, with the standard physical calculations preferably with the location of the vehicle as well as the time. A typical track record would therefore link the position and/or the time and/or the at least one characteristic property of the moving object to the position of the vehicle/moving object and the time.

Accordingly, a track record of the moving object for a predetermined time limit could comprise at least one of the following data:
- the total distance the automobile has travelled,
- the total time the automobile has been driving,
- where and/or when said predetermined limits has been exceeded,
- the maximum speed,
- the maximum acceleration,
- the position,
- the maximum brake distance, and
- the most frequent driving speed of the vehicle.

An example of an application utilizing such a track record is when parents want to monitor the driving habits of their child, which has just got it's driver's licence, with the aim of ensuring its safety.

An example of an application is the insurance companies, which could also implement such system into the cars for teenagers in the age of 17-20, which could result in lowering the insurance fee.

An example of an application is a food delivery company, such as a pizza place that could also integrate this into their cars, therefore enforcing their employees to drive safely and obey the common traffic rules. If an employee would exceed certain upper-limits, such as velocity upper limit or acceleration upper limit, the event would be registered with location and time.

An example of an application is calculation of additional taxes for diesel automobiles, such as jeeps, that pollute more than many other automobiles. The calculations could be based on the following criterion:
- urban driving and
- rural driving.

The charging could, as an example, be lower if the automobile is driven in rural areas than in the city. Therefore, by keeping track of where the automobile was driven, the charging per kilometre could be set accordingly.

In another preferred embodiment the moving object is an aircraft, wherein the file history (the track record) may comprise at least one of the following:
- Whether or not the aircraft is inside recommended 3-dimensional geo-fence,
- speed and/or variations thereof,
- linear acceleration,
- perpendicular acceleration
- altitude and/or variations thereof, and
- position, wherein real time processing of said data can be transformed into a signal and obtained by a receiver. In this case the receiver would be air-traffic controller.

The rate of collecting the GPS-coordinates and/or determining the at least one characteristic property data of the moving object may be as an example every 0.1-2 seconds, including 0.5-1.5 seconds including 0.8-1.2 seconds, wherein preferably the characteristic property data is transmitted to a receiver repeatedly. In the case that the moving object is an aircraft, this is of essential importance so the exact trajectory and orientation of the aircraft is determined frequently. The receiver would in this particular case bye the air-traffic control.

In still another embodiment the system is provided with a means for receiving information, such as from air-traffic control, if the moving object is an airplane. This information could, as an example, be warnings. In the case the moving object is a motor running vehicle, these warnings could indicate when vehicle is outside the range defined by the upper and lower limit of the at least one characteristic property. This could, as an example, be when the vehicle exceeds the velocity limit. In the case the moving object is a ship, the warning could consist of bad weather ahead.

According to the second aspect, the present invention relates to a registration system for determining a track record of a moving object by determining at least one characteristic properties of the object, said system comprising:
- receiving at least three Global-Positioning-System (GPS) coordinates, each of the coordinates comprising the current position of the moving object and the current time, at which the moving object is at the current position,
- storing said coordinates data in a storage means,
- utilizing the at least three coordinates for determining said at least one characteristic properties of the moving object, and thereby obtaining a track record for the moving object, wherein the track record comprises information related to:
- direction of movement
- velocity
- perpendicular acceleration and wherein said track record data is utilized to create user information.

In one preferred embodiment the system further comprising a transceiver for transmitting data from the registration system and/or receiving data. The computer system may be located external from the registration system, in the case the size of the system is to be minimized. This would be the case if the system would be used in a motor running vehicle, such as a car. The powering could be through the electric system of the moving object, such as through the cigarette lighter or by providing it with a battery, preferably rechargeable. The data would then simply be transmitted from the system to a computer system, such as through a wireless network system, which may be a satellite system and/or telephone network and/or radio transmitting system and/or mobile telephone system and/or infrared data transmission, or a system based on Blue Tooth technology where the characteristic properties are determined.

If on the other hand the moving object is larger, the computer system could be integrated into the system, and not be on the receiver's side. If the moving object is an airplane, this system can be regarded as an additional data storage and processing means comprising information relating to at least one of the following data:
- keeping inside recommended 3-dimensional geo-fence,
- speed and/or variations thereof,
- linear acceleration,
- perpendicular acceleration
- altitude and/or variations thereof, and
- position, wherein real time processing of said data can be transformed into a signal and obtained by a receiver.

In another preferred embodiment the system is provided with at least one sensor for determining at least one environmental parameter and associated with a GPS coordinate. These parameters may as an example is precipitation, temperature, moisture, wind-speed etc.

DETAILED DESCRIPTION

In the following the present invention, and in particular preferred embodiments thereof, will be described in greater details in connection with the accompanying drawings in which.

Figure 1:
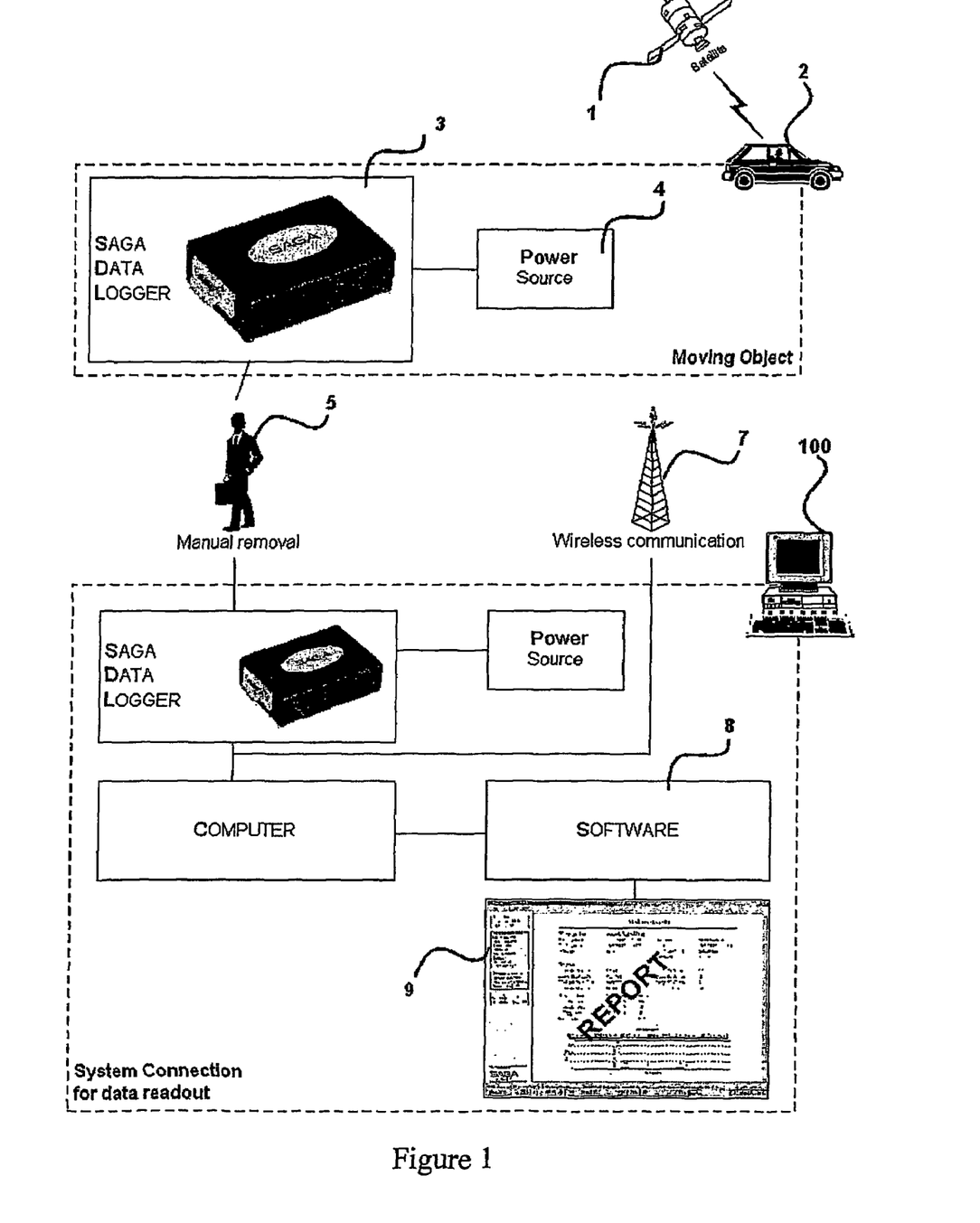
FIG. 1 shows an overview over the system for determining a track record of a moving object.

FIG. 1 shows an overview over the system for determining a track record of a moving object, where the moving object is a car 2. In this example the car is provided with a registration system 3 comprising a Global-Positioning-System (GPS) with an antenna such as ceramic patch, passive antenna for receiving plurality of GPS coordinates from a satellites 1 and a storage means for storing said coordinates. These coordinates give the position of the car 2 as well as the time. The system may be powered by plugging it to the electric system of the car, i.e. the cigarette lighter. The system may also be powered through battery or any other kind of power source. After collecting a plurality of GPS coordinates, such as after on driving cycle, the coordinates are transmitted to a receiver, where at least one, characteristic property of the car is determined. Transmitting the coordinates data by be done manually 5 or through wireless communication 7, such as through satellites system, telephone network, the Internet or by utilizing Blue Tooth technology. On the receiver side software 8 utilizes the coordinates for calculating at least one characteristic property of the car, which may be the velocity, the total travelled distance, the acceleration, the perpendicular acceleration and all variations thereof. A track record 9 of the car is obtained comprising information relating to the driving in this driving cycle. As an example the track record shows the total distance in the driving cycle, where the speed of the car exceeded a predetermined speed limit, and where exactly (with a street name) this event occurred, the speed of the car in a curve, which is determined from the perpendicular acceleration.

In another embodiment the at least one characteristic property of the system may be determined during or after collecting a plurality of GPS coordinates points, so that the data transmitted to a receiver are fully processed data. One application of this is when implementing the system to an airplane, where both the positioning of the airplane as well as other characteristic properties are monitored. The receiver, in this case the air-traffic control would receive information relating to if the airplane is inside recommended 3-dimensional geo-fence or not, the speed and/or variations thereof, the linear acceleration, the perpendicular acceleration altitude and/or variations thereof, and position. Preferably, the system would be provided with receiving means for receiving signals from, in this case, the air-traffic control, which could be warnings.

The essential part here is to receive GPS-coordinates points and utilize these data points in determining characteristic property for an moving object. The moving object may as well be any kind of motor vehicle, a ship etc.

Figure 2:
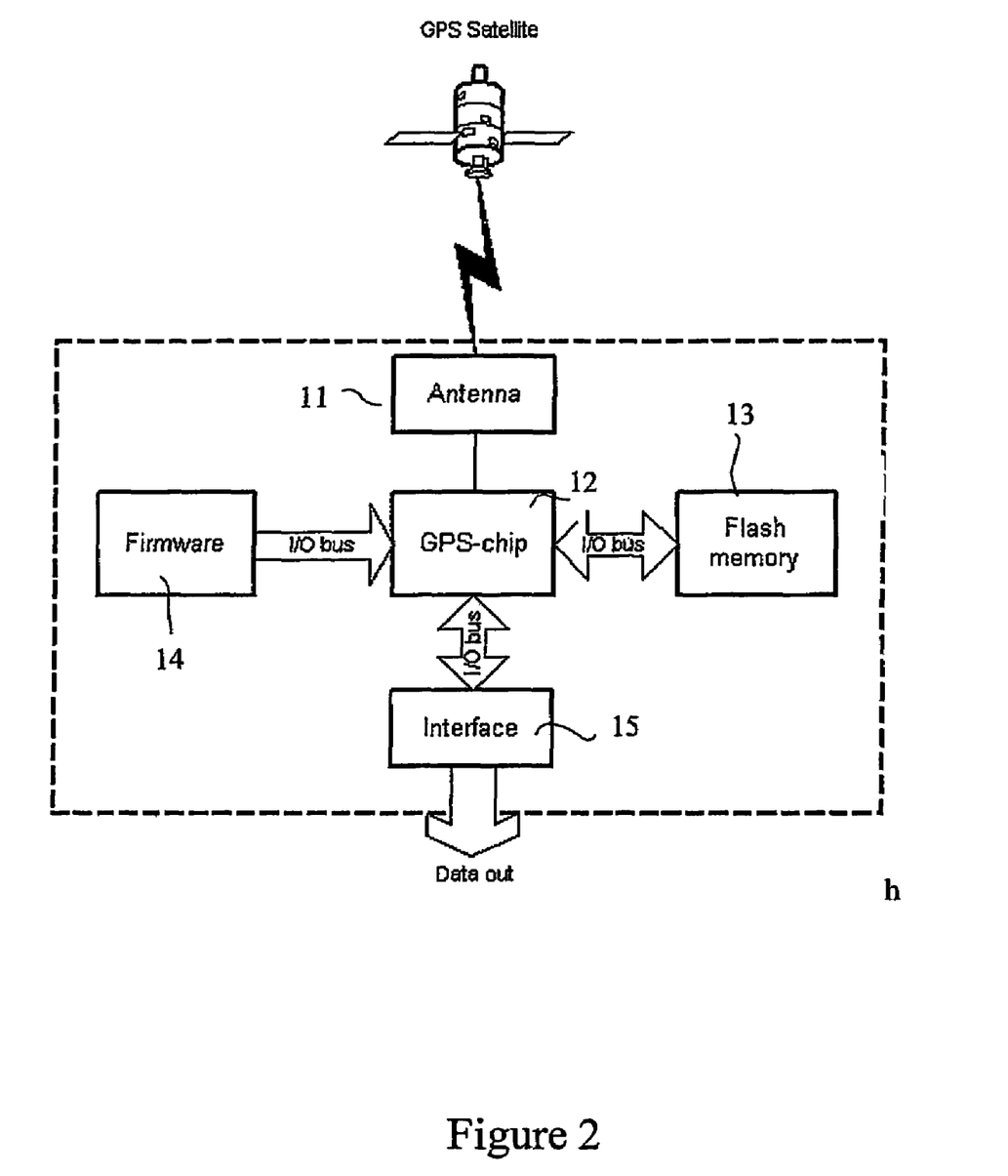
FIG. 2 shows how received and calculated data is stored in the system.

FIG. 2 shows how received and calculated data is stored in the system and how the system determines a track record of a moving object, wherein antenna 11 receive a GPS satellite signal, giving a coordinate of a moving object. A microprocessor 12, preferably a SiRFStar-II chip receives they coordinate data, and stores the data in a storage means 13, preferably a Flash memory. A firmware 14 is also provided for controlling what information goes into the memory and how it is packed and organized. The firmware controls and constructs the data transferred to the flash memory. The data construction is based on data package system. Every data package comprises a number of measurements. First records of data in the package is a full version of the data, a Timestamp (Timestamp ID, full position, full date and a full time).

The rest of data package comes in sets of a predetermined number of measurements and every set ends with a checksum for data reliability verification. Every measurement comprises of a relative number from the last position and a relative number from the time/date in the timestamp.

As an example one data package consists of 28 data including the timestamp data point $(x_T, y_T, t_T)$. This timestamp data point is used as a reference points for the subsequent data points in the data package. The timestamp gives the exact position, usually in latitude and longitude coordinates, of the object $(x_T, y_T)$ as well as an exact date $t_T$, i.e. year, month, day and time. The subsequent data points in this package show the deviation from these coordinates, i.e. $(\Delta x_i, \Delta y_i, \Delta t_i)$ where $\Delta x_i = x_T - x_i$ and $\Delta y_i y_T - y_i$ =with $x_i$ and $y_i$ is the absolute position of later coming GPS-coordinates in the x-and y-axis (i.e north and south, or latitude, and longitude) and $\Delta t_i = t_T - t_i$ is the elapsed time interval from $t_T$. This deviation may also be the deviation from the adjacent GPS-coordinate, so that $\Delta x_i = x_i - x_{i-1}$, $\Delta y_i = y_i - y_{i-1}$ $\Delta t_i = t_i - t_{i-1}$. Therefore, be definging such data package where only the first data point, the timestamp, is used as a reference point and the subsequent coordinate data points in one data package are simply the deviation from this timestamp a space is saved, and larger number of points may be collected, than if all the data points in the data package would be timestamps.

Preferably, the new data package is defined regularly and therefore a new timestamp is defined. This is simply to maintain a high accuracy in the GPS-coordinates and in the later determined characteristic properties of the object. If there is an error in the first timestamp, it will be corrected by the next defined timestamp. Accordingly, a new timestamp defines a new coordinate system with a plurality of coordinates points. The system therefore defines regularly a new coordinate system.

The conditions that can close each timestamp could be:

Time, each data packet has a maximum size.

Speed of vehicle goes under predetermined limit

N/S/E/W indicator change (For instance N/W to N/E)

The GPS signal strength goes under predetermined level

The conditions that have to be met before starting to log a new data package could be:

Five seconds after transition from GPS signal strength below predetermined level to above & speed is above a certain predetermined limit Speed transition from under predetermined limit to above & GPS signal strength above predetermined level In the Timestamp ID it can be determined if the following events have occurred since the last measurement.

Power loss

GPS signal strength gone to invalid

GPS signal strength gone below predetermined level

The interface (5) from the data storage and to the data processing system can go trough a wireless transmission as mentioned earlier, such as through satellite system or telephone network or the transmission may be through plugging the system to a computer system and download the data to the data processing system.

EXAMPLE

The following example illustrates one data package with a plurality of increment packages, wherein each increment package comprises three increment elements.

| 20 bytes | Timestamp | | | | |
|---|---|---|---|---|---|
| | Start ID | Time/Date | Latitude | Longitude | Checksum |

| 20 bytes | Increment Packet nr1 | | | |
|---|---|---|---|---|
| | Inc. Latitude | Inc. Longitude | Milliseconds | |
| | Inc. Latitude | Inc. Longitude | Milliseconds | |
| | Inc. Latitude | Inc. Longitude | Milliseconds | Checksum |

| 20 bytes | Increment Packet nr2 | | | |
|---|---|---|---|---|
| | Inc. Latitude | Inc. Longitude | Milliseconds | |
| | Inc. Latitude | Inc. Longitude | Milliseconds | |
| | Inc. Latitude | Inc. Longitude | Milliseconds | Checksum | etc . . .

Total of 9 increment packets in 1 Data Packet

Timestamp:

The first element in the data package is the Timestamp element, comprising:

| FDFD | 13.02.2002-17:38:21:215 | −64,12584 | 21,54871 | f5h |
|---|---|---|---|---| where start ID, which is the first field in the Timestamp, tells the system the ID type of the Timestamp. There are numerous types of Start ID;

FDFD=When the unit comes out of a power loss.

FCFC=When the unit had lost signal and comes in again.

FFFF=Normal, when the unit is logging continuously without power and signal loss.

The second field in the Timestamp is the Date and time, with milliseconds. Latitude and longitude position comes after that in the third and fourth field in the Timestamp. Check-sum in the fifth field in the Timestamp is used to find out weather the Timestamp is damaged or not and is found by summing up all the 14 bytes (ignore overflow bit) and using XOR.

Increment elements in the first increment package, following after the timestamp element, reflect, as mentioned before, the changes in the latitude, longitude and time difference from the Timestamp value. The first and second increment elements (coordinate-point) in increment package nr.1 could have the following coordinates:

| Increment element nr 1: | | |
|---|---|---|
| 1251 | 349 | 1345 | with 1251 as the latitude change from the Timestamp latitude value, 349 the longitude change and 1345 the time change (milliseconds), and the second increment element the coordinate

| Increment element nr 2: | | |
|---|---|---|
| 1008 | 142 | 1350 |

In this example every third increment element in each increment package has an additional element, which is the check-sum that verifies that three last increment elements are valid, i.e.

| Increment element nr 3: | | | |
|---|---|---|---|
| 1240 | 124 | 1310 | 5fh | with 5fh showing the checksum, and the other 1240, 124 and 1310 the change in the latitude, longitude and time from the Timestamp.

Accordingly each increment package with three increment elements require only 20 bytes, versus 20 bytes for only one Timestamp coordinate point. Therefore, if each data point in the increment packages would be a Timestamp point instead of increment element, each increment package would require 3*20 bytes=60 bytes, instead of 20 bytes. Therefore the data capacity in the present system is enlarged.

The checksum could as well be the in the second, fourth, fifth etc. increment element in the increment package.

Figure 3:
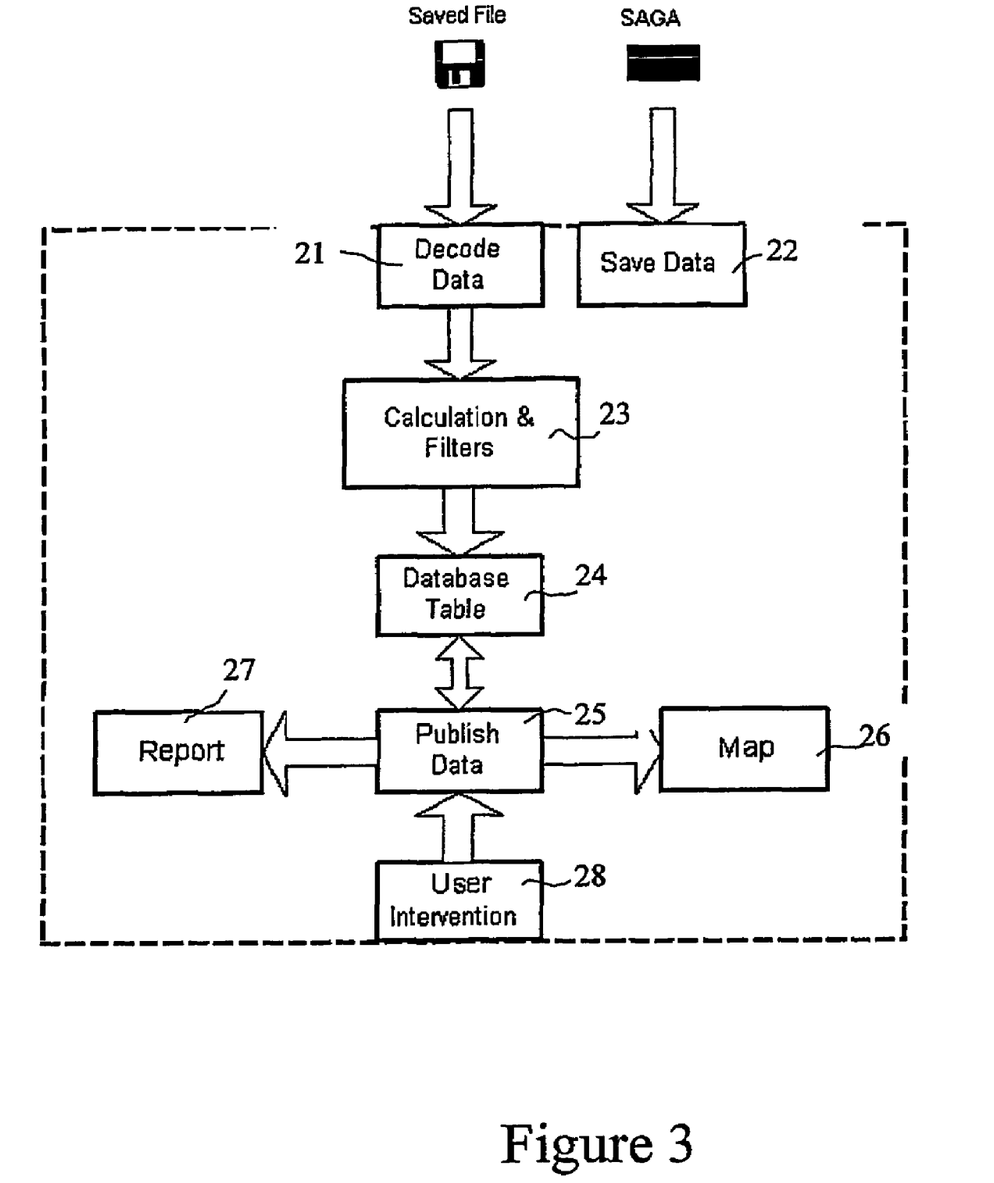
FIG. 3 shows a flow diagram of how the downloaded data in the system is published through user intervention to a map or a report.

FIG. 3 shows a flow diagram of how the data in the system is downloaded to a receiver. The raw measurement data in the device's memory is downloaded to the system and saved for later processing 22. In this embodiment the data decode 21 is the part of the system were data is decoded from a raw-data file. The decoded raw data is then filtered 23 according to specified criteria, such as if there is an error in the calculating a characteristic property such as the acceleration is too large, it will not be shown, and it can also happen that the same coordinate point is collected twice. In this level all calculations in the at least one characteristic property of the moving object are performed on the decoded data and filters are applied where needed. The final processed data is then stored in a database table 24 and is ready to be used for publishing reports and displaying maps. Information from this database is published 25 according to user set criteria 28 and displayed either on maps 27 or in reports 26. The user can, as an example, specify start and end time of reports, maximum or minimum of at least one of the moving vehicle's characteristics, the duration of a vehicle standstill and etc.

Figure 4:
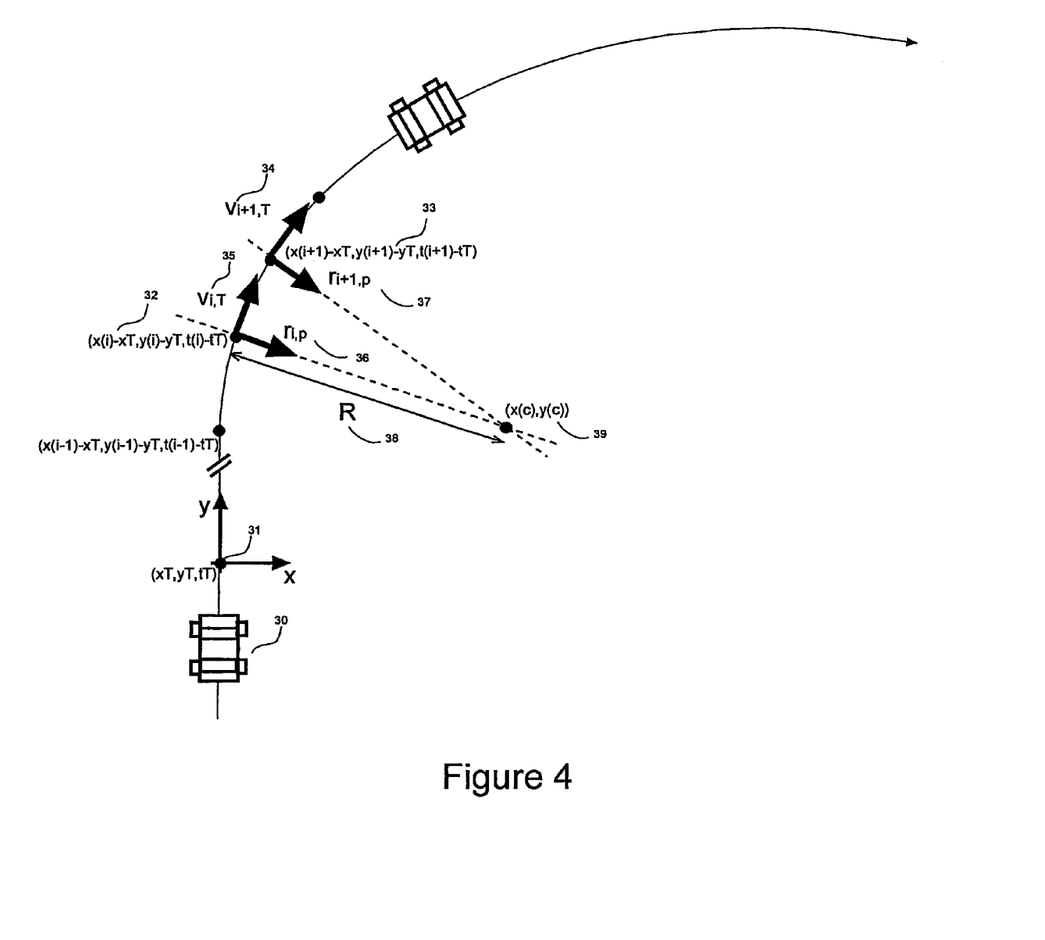
FIG. 4 shows one embodiment of how the perpendicular acceleration may be determined from an automobile driving in a curve.

FIG. 4 shows one embodiment of how the perpendicular acceleration may be determined from an automobile 30 driving in a curve. A plurality of GPS coordinates points including the timestamp 31 is shown. All subsequent GPS coordinate points are, as mentioned earlier, the variation from the Timestamp. In this example and in a simplified picture assuming the coordinates are as real coordinates, the transversal (T) speed $V_{i,T}$ and $V_{i+1,T}$ of the automobile is determined through:

$$Vi, T = \frac{\sqrt{((x(i)-x(i-1))^2+(y(i)-y(i-1))^2)}}{t(i)-t(i-1)}, \quad (1)$$

$$Vi+1, T = \frac{\sqrt{((x(i+1)-x(i))^2+(y(i+1)-y(i))^2)}}{t(i+1)-t(i)}, \quad (2)$$

where the travelled distance is the distance between two points, in this case adjacent points utilizing Pythagorean theorem. The radius R 38 of the curved path, is where the vectors $r_{i,p}$ 36 and $r_{i+1,p}$, perpendicular to the tangent in the two points, intersect 39. These two vectors are given as:

$r_i=(x(i)-xT-x(c),y(i)-yT-y(c))$ and $r_{i+1}=(x(i+1)-xT-x(c),y(l+1)-yT-y(c))$, with (xc,yc) as the intersection point. Using standard vector calculations the intersection (xc,yc) 39 is obtained and therefore the radius R 38, from which the perpendicular acceleration is obtained, i.e.

$a_{cent}=V^2_{i,T}/R.$

Also by summing up the distance between two points, preferably adjacent points, by using Pythagorean theorem as shown in Eqs. (1) and (2) the total travelling distance of the automobile is obtained.

However in reality, the GPS coordinates are presented as latitude and longitude coordinates. In one preferred embodiment the GPS technology, WGS-84 (World Geodetic System 1984) is used. This model assumes an ellipsoid with a semi-major axis (equatorial radius) a=6,378,137 m, and a semi-minor axis (polar radius) b=6,356,752.3142 m (defined as 1/f=1/298.257223563, where f=(a−b)/a).

Usually, an agricultural field has relatively small size (with respect to the Earth), and may be considered as a flat surface at a particular location on the Earth. Therefore, in order to convert geographic coordinates into linear units (real coordinates) it is necessary to define the distance corresponding to a 1° change in longitude ($F_{lon}$) and latitude ($F_{lat}$) for a specific field location (average geographic latitude φ and height over ellipsoid h).

These conversion factors may be determined using the relation $$F_{lon} = \frac{\pi}{180°}\left[\frac{a^2}{\sqrt{(a^2\cos^2\varphi+b^2\sin^2\varphi)}}+h\right]\cos\varphi,$$

$$F_{lat} = \frac{\pi}{180°}\left[\frac{a^2b^2}{\sqrt{(a^2\cos^2\varphi+b^2\sin^2\varphi)^{3/2}}}+h\right]\ldots$$

Distance between two points can be found using the following formula:

$\mathrm{Dis}=\sqrt{(F_{lat}(\phi_1-\phi_2)^2)+(F_{lon}(\lambda_1-\lambda_2)^2)},$ with λ is the longitude coordinate (°W) and φ the latitude coordinate (°N).

The invention claimed is:

1. A method for determining a track record of a moving object by determining at least one characteristic properties of the object, said method comprising:
   receiving at least three Global-Positioning-System (GPS) coordinates, each of the coordinates comprising the current position of the moving object and the current time, at which the moving object is at the current position,
   storing said coordinates data in a storage means,
   utilizing the at least three coordinates for determining said at least one characteristic properties of the moving object,
   and thereby obtaining a track record for the moving object,
   wherein the track record comprises information related to:
   direction of movement
   velocity
   perpendicular acceleration
   and wherein said track record data is utilized to create user information.

2. A method according to claim 1, wherein the rate of collecting the GPS-coordinates and/or determining the at least one characteristic property data of the moving object is in the range of 0.01-2 seconds.

3. A method according to claim 1 wherein the moving object collects the first GPS data when its engine is running.

4. A method according to claim 1, wherein the collection of the GPS data is based on starting and shutting down the engine of the moving object.

5. A method according to claim 1, wherein the moving object collects the first GPS data when it exceeds a predetermined velocity limit.

6. A method according to claim 1, wherein the coordinates data are stored as at least one data package, the at least one data package comprising at least one timestamp coordinate point as a reference point for said at least one data package, the timestamp giving the absolute position and absolute time of the moving object, and a plurality of coordinate data points as a deviation from the timestamp coordinate point.

7. A method according to claim 1, wherein the at least one characteristic property of the object is determined and stored prior to transmitting the GPS and characteristic property data to a computer system.

8. A method according to claim 1, wherein the track record of the moving object for a predetermined time limit comprises at least one of the following data:
   the total distance the automobile has travelled,
   the total time the automobile has been driving,
   where and/or when said predetermined limits has been exceeded,
   the speed,
   the acceleration,
   the perpendicular acceleration,
   the position,
   the brake distance, and
   at what speed the moving object was most frequently moving.

9. A method according to claim 1, wherein the track record comprises linking the position and/the time of the moving object to each of the at least one characteristic property data.

10. A method according to claim 1, further comprising means for obtaining at least one environmental parameter, wherein each of said parameters can be associated with a GPS coordinate.

11. A method according to claim 1, wherein the at least one environmental parameters is one of precipitation, temperature, moisture, or wind-speed.

12. A method according to claim 1, wherein the at least one environmental parameters influence how the upper-and lower limit of the at least one characteristic property is defined.

13. A method according to claim 1, further comprising means for transmitting the track record data and the at least one characteristic property data through a wireless network to a recipient.

14. A method according to claim 1, wherein the GPS coordinates are transmitted to a computer system on a receiver side.

15. A method according to claim 1, wherein the information comprises any of the following:
    moving manner,
    velocity comparison with a velocity database,
wherein the velocity database includes information about upper and lower velocity limits in certain areas.

16. A method according to claim 1, wherein the at least one characteristic property of the object is determined in the computer system subsequently after transmitting the GPS data to the computer system and based thereon the track record of the moving object is obtained.

17. A method according to claim 1, wherein the user is the moving object.

18. A method according to claim 1, wherein the at least one characteristic property data are transmitted to a receiver repeatedly.

19. A method according to claim 1, further comprising means for receiving user information from the receiver.

20. A method according to claim 1, wherein the received user information from the receiver is a warning signal, indicating when the moving object is outside the interval defined by the upper and lower limit of the at least one characteristic property.

21. A method according to claim 1, wherein the moving object is a motor vehicle.

22. A method according to claim 1, wherein the moving object is an airplane.

23. A method according to claim 22, wherein the track record of the airplane comprises at least one of the following data:
    keeping inside recommended 3-dimensional geo-fence,
    speed and/or variations thereof,
    linear acceleration,
    perpendicular acceleration
    altitude and/or variations thereof, and
    position,
wherein real time processing of said data can be transformed into a signal and obtained by a receiver.

24. A method according to claim 1, wherein the receiver is air-traffic controller.

25. A method according to claim 1, wherein the moving object is a ship.

26. A registration system for determining a track record of a moving object by determining at least one characteristic properties of the object, said system comprising:
    means for receiving at least three Global-Positioning-System (GPS) coordinates, each of the coordinates comprising the current position of the moving object and the current time, at which the moving object is at the current position,
    means for storing said coordinates data in a storage means,
    means for utilizing the at least three coordinates for determining said at least one characteristic properties of the moving object,
and thereby obtaining a track record for the moving object, wherein the track record comprises information related to:
    direction of movement
    velocity
    perpendicular acceleration
and wherein said track record data is utilized to create user information.

27. A system according to claim 26, further comprising at least one sensor for measuring at least one environmental parameter and associate said parameter with a GPS coordinate.

28. A system according to claims 26 or 27, further comprising a transceiver for transmitting and/or receiving data from the registration system.

29. A system according to claim 26, wherein a computer system is located external from the registration system.

30. A system according to claim 26, wherein the data transmitting and/or data receiving is performed through a wireless network system.

31. A system according to claim 30, wherein the wireless network is one selected from group of a satellite system, a telephone network, a radio transmitting system, a mobile telephone system, and an infrared data transmission.

32. A system according to claim 26, wherein the moving object is a motor vehicle.

33. A system according to claim 32, wherein the registration system is plugged to the electric system of the motor vehicle for powering the registration system.

34. A system according to claim 32, wherein the registration system is provided with a battery for powering the registration system.

35. A system according to claim 26, wherein the moving object is an airplane and the system is an additional data storage and processing means comprising information relating to at least one of the following data:
    keeping inside recommended 3-dimensional geo-fence,
    speed and/or variations thereof,
    linear acceleration,
    perpendicular acceleration
    altitude and/or variations thereof, and
    position,
wherein real time processing of said data can be transformed into a signal and obtained by a receiver.

36. A system according to claim 35, wherein the receiver is air-traffic controller.

37. A method according to claim 2, wherein the rate of collecting the GPS-coordinates and/or determining the at least one characteristic property data of the moving object is in the range of 0.5-1.5 seconds.

38. A method according to claim 37, wherein the rate of collecting the GPS-coordinates and/or determining the at least one characteristic property data of the moving object is in the range 0.8-1.2 seconds.

* * * * *